Aug. 9, 1938.  F. T. COPE  2,126,534
CONTROLLED ATMOSPHERE FURNACE CONSTRUCTION AND OPERATION
Filed May 22, 1936  3 Sheets-Sheet 1
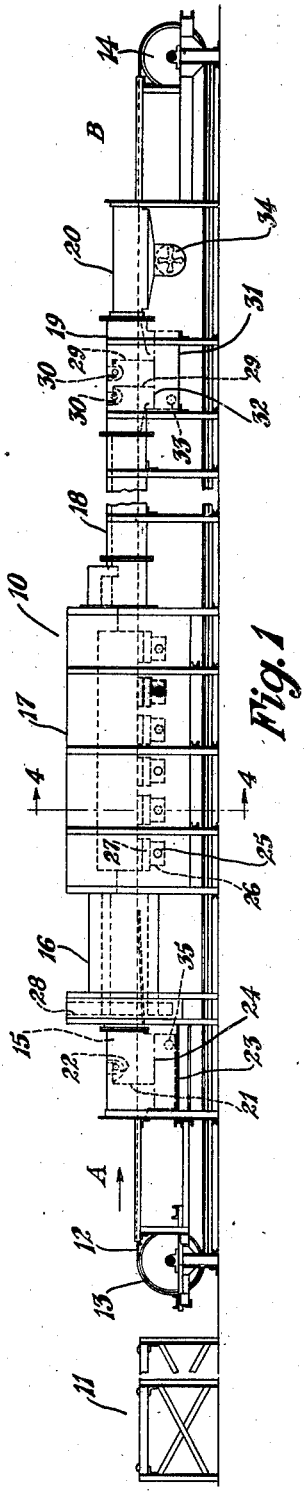
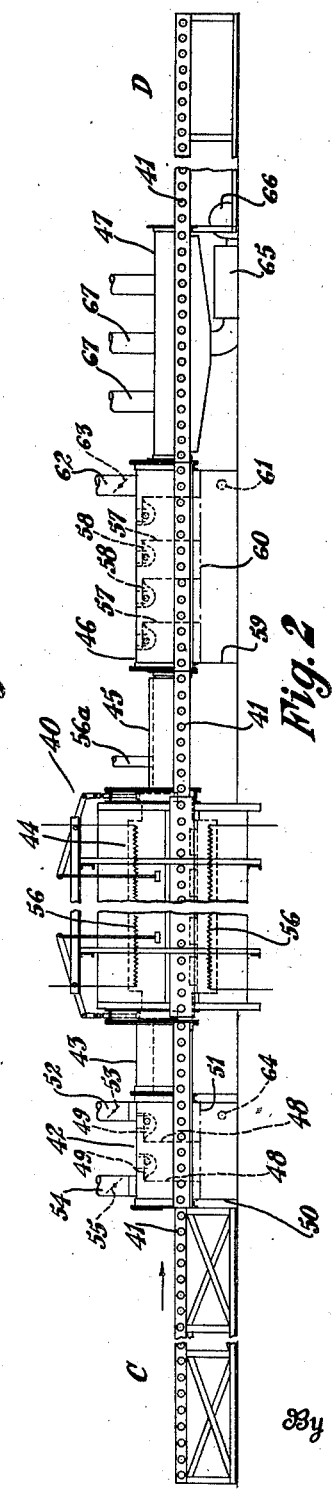
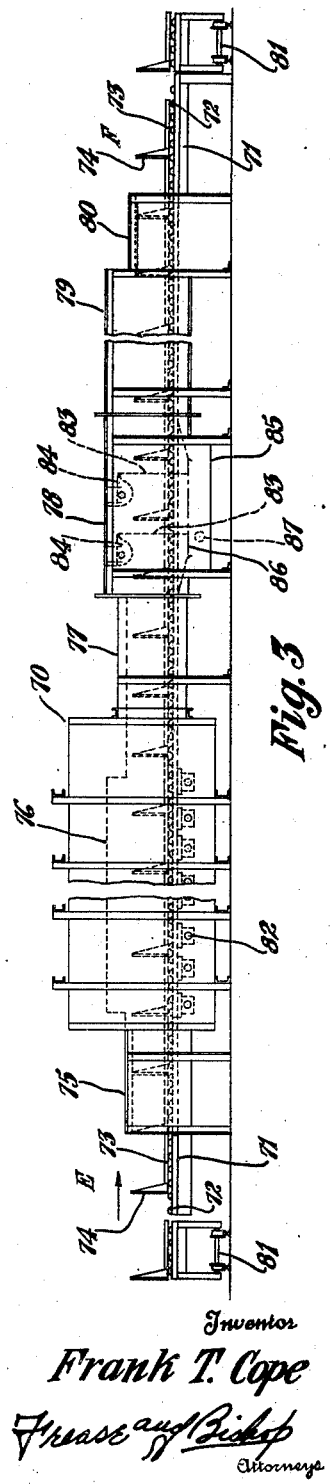
Inventor
Frank T. Cope
By Frease and Bishop
Attorneys Aug. 9, 1938.   F. T. COPE   2,126,534
CONTROLLED ATMOSPHERE FURNACE CONSTRUCTION AND OPERATION
Filed May 22, 1936   3 Sheets-Sheet 2

Inventor
Frank T. Cope

Aug. 9, 1938.  F. T. COPE  2,126,534
CONTROLLED ATMOSPHERE FURNACE CONSTRUCTION AND OPERATION
Filed May 22, 1936  3 Sheets-Sheet 3
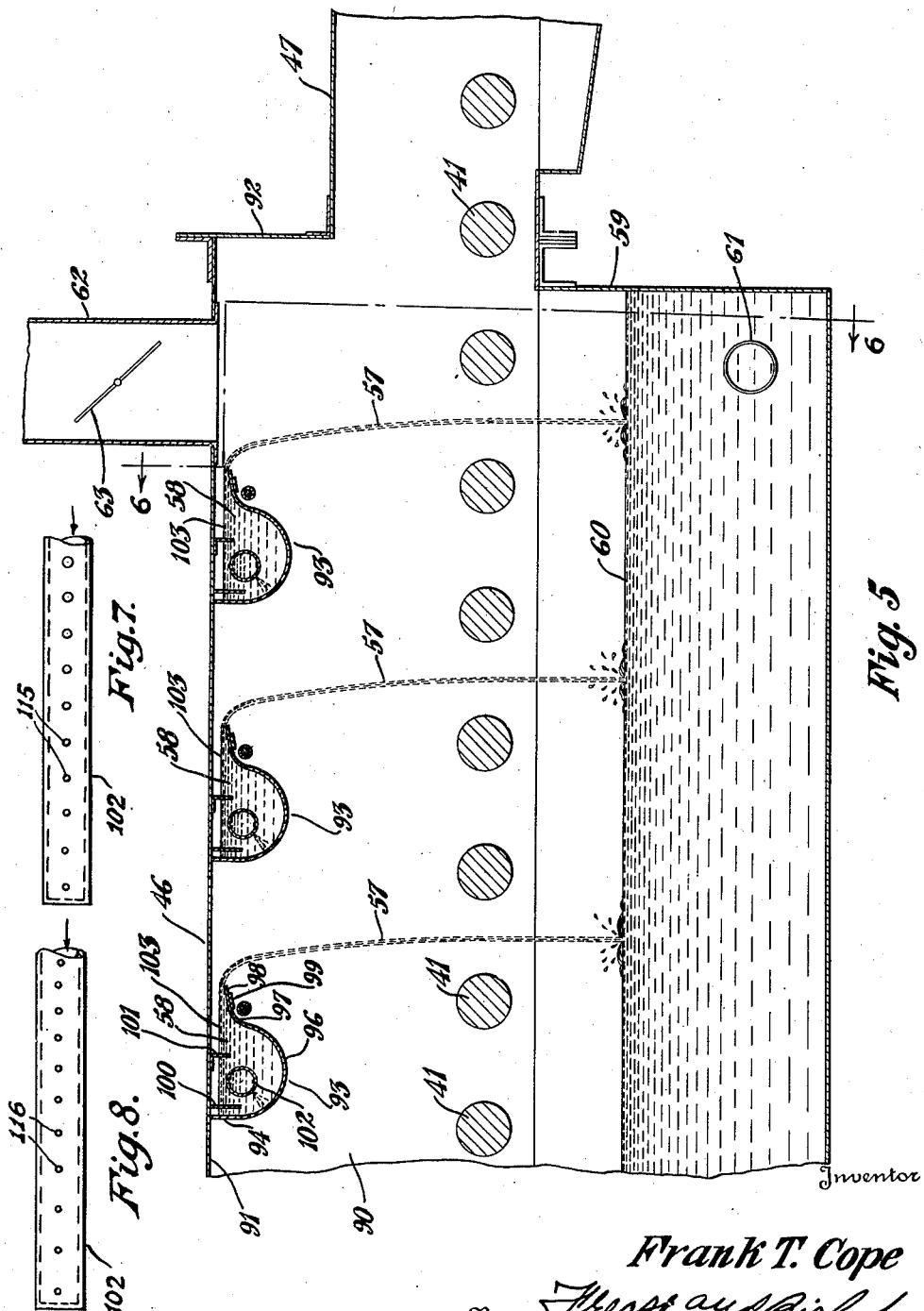
Inventor
Frank T. Cope
By Pease and Bishop
Attorneys Patented Aug. 9, 1938

2,126,534

UNITED STATES PATENT OFFICE 2,126,534

CONTROLLED ATMOSPHERE FURNACE CONSTRUCTION AND OPERATION

Frank T. Cope, Salem, Ohio, assignor to The Electric Furnace Company, Salem, Ohio, a corporation of Ohio Application May 22, 1936, Serial No. 81,280

13 Claims. (Cl. 266—4)

The invention relates generally to furnaces and is particularly applicable to special or controlled atmosphere furnaces which are used for the heating or heat treatment of ferrous or non-ferrous metals or alloys, or metal products made from such metals or alloys, including among others, tubes or pipes, either coiled or in straight lengths, bars, rods, sheets, strips, stripsheets and the like; and more particularly, the invention relates to an improved manner of sealing either or both of the entrance or exit means for furnaces, and to an improved manner of handling, quenching and treating materials in heating or heat treating furnaces.

Special or controlled atmosphere furnaces are extensively used for the heating or heat treatment of ferrous or non-ferrous metals or alloys or products thereof; and such furnaces may be electrically heated, gas fired, radiant tube heated, or heated by any other means, so long as the desired special atmosphere is maintained or controlled within the furnace chambers, zones or compartments. A special atmosphere frequently used, as in connection with the bright annealing of copper or copper alloy products, is one which is slightly reducing in character, or at least non-oxidizing in resultant effect upon the surfaces of the materials being treated.

Ordinarily, ferrous metals or alloys cannot be satisfactorily treated in a special atmosphere furnace in which an open flame is present, and for this reason, special atmosphere heat treating furnaces for ferrous metals and alloys or products made therefrom are usually electrically heated or are heated by radiant tube heating means.

However, non-ferrous metals or alloys, such as for example copper or brass, may be satisfactorily heat treated in a special atmosphere furnace in which an open flame is present, as in a direct fired gas burning furnace, by so controlling combustion therein that the products of combustion, which provide at atmosphere within the furnace, will be reduced or at least non-oxidizing in character; and this may be accomplished by providing for a slight deficiency of air for combustion.

There are many types of heating or heat treating furnaces, such as batch furnaces or continuous furnaces. Likewise, there are many types of continuous or semi-continuous furnaces, as for example: chain, fabric or reticular belt conveyor furnaces and the like; roller hearth furnaces in which the materials to be treated move directly on the roller hearth, or on trays and the like supported and moved on the roller hearth; and pusher type furnaces.

In all such furnaces a number of problems are involved, and these problems are especially difficult of solution, in special or controlled atmosphere furnaces. First, in so far as it is possible to do so, atmospheric air must be prevented from entering the chambers or zones wherein it is desired to maintain the special atmosphere; the special atmosphere must be provided and maintained; and changes in the temperature or analysis of the atmosphere sought to be maintained must be guarded against.

These problems are even more difficult in connection with a continuous or semi-continuous type furnace, because provisions must be made for the entry and withdrawal of material to and from such furnaces; and the condition of the furnace atmosphere is ordinarily affected or disturbed to a considerable degree, coincident with the entry or withdrawal of material to or from such furnaces.

Second, the first problem must be satisfactorily taken care of irrespective of the size or shape of the articles, objects or materials being treated; and although this second problem is not difficult of solution, if all objects, articles or materials being treated in one particular furnace are of uniform and favorable outline, size and shape, the problem does become exceedingly difficult of solution in connection with the heat treatment in any particular furnace of objects, articles or materials of varying sizes, varying shapes, or irregular outlines or contours.

Third, the first two problems may be partially solved if and when furnaces are constructed with extremely long entrance or exit passages; but such expedients involve considerable additional expense, not only in the cost of construction and operation of the furnace itself, but also in the requirement for longer factory buildings in which much of the space is not efficiently utilized.

Accordingly, it is important that the first two problems be satisfactorily taken care of in a relatively short length furnace, having relatively short entrance and/or exit passages, so as to require only a minimum amount of space in a fabricating or processing plant.

I have discovered that these problems may be satisfactorily solved and many other difficulties incident to the operation of heating or heat treating furnaces may be avoided, that the cost of operation of special atmosphere furnaces may be materially reduced, and that objects or materials of varying size or shape may be heat treated in directly fired furnaces, by providing one or a plurality of liquid curtains, the nature of which will more fully appear, as a seal or closure, for either or both of the entrance or exit passages or communications of a furnace, through which seal or closure the objects or materials being treated may pass freely without interruption, and without, in the case of a special atmosphere furnace, causing the escape of any considerable volume of the special atmosphere as the materials or articles pass through the liquid curtain seal or closure, or without causing atmosphere air to enter the furnace compartments at such time.

Moreover, such liquid curtains forming seals or closures at the exit end of heat treating furnaces may also be used for the additional function or purpose of quenching the materials or articles being treated, which may be a desirable adjunct to certain heat treating operations and which may frequently be used for shortening the over-all time required for performing a heat treating operation.

Accordingly, it is an object of the present invention to provide an improved closure or seal for a heating or heat treating furnace through which materials to be treated having varying sizes or shapes may be readily and freely passed without causing any appreciable disturbance to the temperature or analysis of the atmosphere within the furnace or compartments leading to or from the same due to the passage of materials through the closure or seal.

It is a further object of the present invention to provide a special or controlled atmosphere heating or heat treating furnace with improved closure or sealing means through which either ferrous or non-ferrous metals or alloys or materials, articles or products made therefrom, including among others, tubes, pipes, bars, rods, sheets, strips, stripsheets and the like, may be passed for introducing the same into or for withdrawing the same from the furnace without causing the escape from the furnace of any objectionable volume of the special atmosphere, or without causing atmospheric air to enter the furnace incident to the passage of materials through the closure or sealing means.

Moreover, it is an object of the present invention to provide improved closure means for a heating or heat treating furnace, which, regardless of the character of the furnace heating means, at all times effectively seals and closes the furnace passage, opening or communication with which it is associated, and which likewise enables the free passage of material therethrough into or out of the furnace.

Likewise, it is an object of the present invention to provide an improved closure or sealing means for a furnace which may be readily adapted or used in connection with almost any type of heating or heat treating furnace such as batch, semi-continuous or continuous furnaces, including, among others, belt conveyor furnaces, roller hearth furnaces and pusher furnaces.

Another object of the present invention is to provide closure means for furnaces which enables doors for the entrance and exit openings of the furnace, and the operating and mounting mechanism therefor, to be dispensed with.

Also it is an object of the present invention to provide improved sealing or closure means for a heating or heat treating furnace in which a special atmosphere may be readily maintained and controlled without regard to the entry or withdrawal of material to or from the furnace through the sealing or closure means.

Another object of the present invention is to provide an improved special atmosphere continuous or semi-continuous heating or heat treating furnace construction in which sealing or closure means are utilized for either or both of the entry or exit ends of the furnace, and through which sealing or closure means materials to be treated in the furnace may be continuously or intermittently passed without disturbing the controlled special atmosphere in the furnace.

Additionally, it is an object of the present invention to provide a heating or heat treating furnace with sealing or closure means at the exit end thereof, through which materials being treated may be readily passed, and which sealing or closure means may be utilized for quenching material issuing from the furnace.

Also, it is an object of the present invention to provide improved sealing or closure means for one or more openings of a heating or heat treating furnace, which enables a relatively short length furnace to be constructed having relatively short entrance and/or exit passages.

Moreover, it is an object of the present invention to provide the exit passage or communication of a heating or heat treating furnace with improved liquid curtain sealing or closure means, which may be utilized for bringing the materials passing therethrough to a substantially constant, predetermined, uniform, temperature, and which sealing or closure means may have a drying chamber located immediately adjacent thereto to prevent surface marks or discoloration from resulting on the material surfaces due to contact of the closure liquid therewith.

The foregoing and other objects are obtained by the furnace constructions, apparatus, parts, improvements, methods, operations, combinations, and sub-combinations, which comprise the present invention; the nature of which is set forth in the following general statements; preferred embodiments of which, together with their mode of use or operation, are set forth in the following description; and which are particularly and distinctly pointed out and set forth in the appended claims forming part hereof.

The nature of the improvements of the present invention may be described in general terms as including in furnace construction having an entrance or exit passage or communication, means for sealing such passage or communication including one or more substantially unbroken sheets or curtains of falling liquid coextensive in width or breadth with the width or breadth of the furnace passage and cutting off communication between the furnace atmosphere and the exterior atmosphere from the source body of the liquid to the fallen body of the liquid, which bodies of liquid define the upper and lower confines of the furnace passage, said liquid curtains admitting of free passage of materials therethrough, preferably means for maintaining the temperature of said curtain liquid substantially constant at a predetermined degree, and preferably means associated with a furnace exit closure or sealing means for drying material immediately after passing through said liquid curtain closure or sealing means.

By way of example, several embodiments of the present improvements are illustrated in the accompanying drawings, forming part hereof, in which Figure 1 is a fragmentary, diagrammatic, side elevation of a gas fired, special atmosphere, belt conveyor furnace having entrance and exit compartments or passages equipped with the improved sealing or closure means;

Fig. 2 is a similar view of an electric roller hearth furnace having entrance and exit compartments or passages equipped with the improved closure or sealing means;

Fig. 3 is a similar view of a gas fired pusher type controlled atmosphere furnace having an exit compartment or passage equipped with the improved closure or sealing means;

Fig. 5 is an enlarged, fragmentary, partially diagrammatic, longitudinal section illustrating the improved closure or sealing means;

Fig. 7 is a fragmentary view of one form of inlet pipe for the closure and the sealing means; and Fig. 8 is a fragmentary view of a modified form of inlet pipe for the closure and sealing means.

Similar numerals refer to similar parts throughout the several figures of the drawings.

Figure 4:
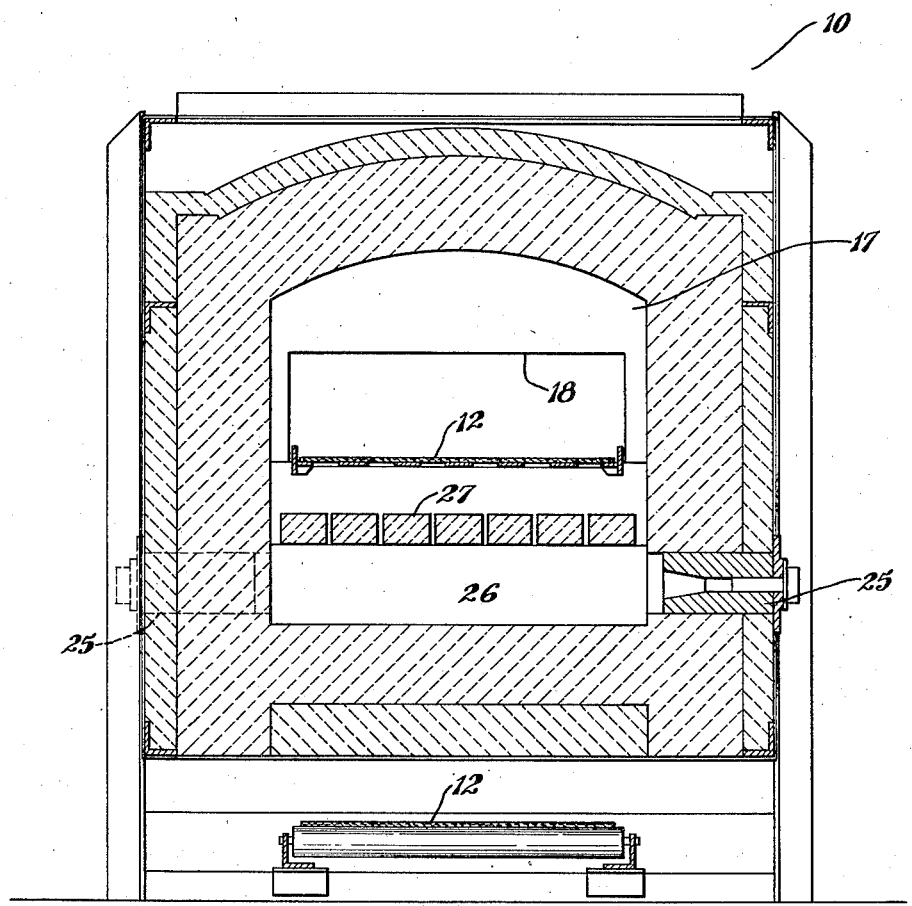
Fig. 4 is a cross section taken on the line 4—4, Fig. 1 through the heating zone or compartment of the furnace, shown in Fig. 1.

Referring first to Figs. 1 and 4, a gas fired, special atmosphere, belt conveyor, bright annealing furnace is indicated generally at 10, and may be used for carrying out a bright annealing or heat treating operation on material such as copper pipes or tubing which may be in straight lengths or in a coiled form. Removable roll stands 11 may be provided at the entrance end of the furnace for loading straight lengths of tubing, from which the tubing may be readily transferred to the fabric mesh reticular furnace belt conveyor 12, which passes endlessly through the furnace in the direction of the arrow, back underneath the furnace, and around drums 13 and 14. Unloading stands (not shown) similar to the loading stands 11, may be provided at the exit end of the conveyor adjacent to the drum 14.

If coiled tubes are to be heat treated, the roll stands 11 are not used, but the coiled tubes may be loaded directly on the conveyor belt 12 at the zone indicated generally at A. The conveyor belt 12 is preferably at all times moving quite slowly and thereby carries material loaded thereon, first through the entrance passage compartment or chamber indicated at 15, then through the preheating chamber indicated at 16, then through the furnace heating chamber indicated at 17, then through the cooling chamber indicated at 18, then through the quenching and sealing chamber indicated at 19, and finally through the drying chamber indicated at 20; and the material issuing from the furnace may be unloaded from the conveyor belt at the unloading zone designated generally at B.

The entrance chamber, passage or compartment 15 is provided with the improved sealing or closure means, consisting of a sheet or curtain 21 of falling liquid, for example water, which falls from the source body of water indicated generally at 22. The curtain 21 is coextensive in width or breadth with the width or breadth of the chamber or passage 15 and falls to the fallen body of water collected in the sump 23. The upper level of the fallen body of water is indicated by the dot-dash water level line 24.

The water curtain 21, the source body 22 and the fallen body 24 will be later described more in detail, it being sufficient to state at this time that the conveyor belt and material thereon may be freely passed through the water curtain without substantially affecting the sealing characteristics of the curtain as a closure for the entrance compartment 15.

The sump 23 may also be provided with an outlet 35 from which liquid collected in the sump may be recirculated by a pump to the source body 22.

As stated, the furnace may be gas fired, as by means of burners 25 communicating with chambers 26 located beneath the checker hearth 27 through which the flame and products of combustion pass into the heating compartment or zone 17. The products of combustion may then pass from the heating chamber 17 to the preheating chamber 16 and out the flue 28 provided adjacent to the entrance compartment 15.

The combustion in the furnace chamber 17 is so controlled, for example, by maintaining a slight deficiency of air for combustion, that the resulting gases are reducing or at least non-oxidizing in character so that the material passing through the furnace will not be discolored in any way in the heating chamber. The flue 28 is preferably provided adjacent to the entrance compartment 15, in which the sealing or closure water curtain 21 is maintained, so that any pressures which may develop in the heating chamber 17 may be controlled by dampers in the flue 28 in order to maintain substantially equal pressures on both sides of the water curtain 21.

The control or balance of pressures on both sides of the water curtain 21 is of importance, so that the water curtain 21 will not be blown through or broken by greatly unbalanced pressures. Usually it may be desired to maintain a slight pressure in the compartment 15 on the inside of the curtain 21 so that if the curtain is broken through, there will be an out leakage of furnace gases rather than an in leakage of atmospheric air.

The material being treated, after passing through the heating compartment 17, which is maintained at the desired temperature for performing the desired heating or heat treating operation, then passes through the initial cooling chamber 18, in which the material cools somewhat. Thereafter the material passes through the quenching and sealing chamber 19 in which a plurality of falling liquid curtains or sheets 29, preferably water curtains, are maintained, similar to the water curtain 21.

The water curtains 29 fall from source bodies of water indicated generally at 30 maintained within the compartment 19, to the sump 31 wherein the fallen body of water, the upper level of which is indicated by the dot-dash water level line 32, is collected. The curtains 29 are coextensive in width or breadth with the width or breadth of the quenching and sealing chamber 19, and the conveyor belt 12 and material thereon may be freely passed through the water curtains 29 without affecting the sealing characteristics of the curtains as closures for the quenching and sealing chamber 19.

Figure 6:
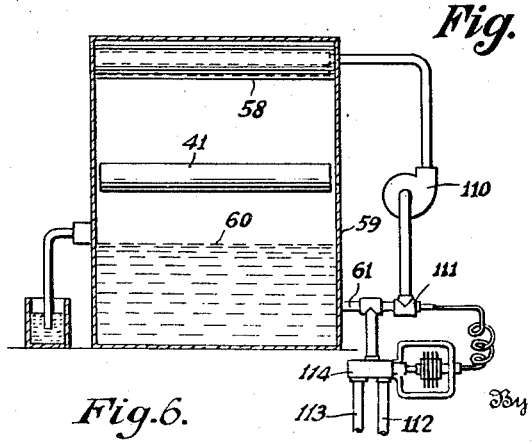
Fig. 6 is a diagrammatic sectional view taken as on the line 6—6, Fig. 5.

The sump 31 may be provided with an outlet 33 to which a recirculating pump may be connected in the manner shown in Fig. 6 for circulating the liquid back to the source bodies 30; and the circulation system may if desired, be equipped with a thermostatic control such as shown in Fig. 6 and provided with steam or cold water inlets so that the temperature of the water curtains 29 may be maintained at approximately 190° F., or just below the temperature of vaporization thereof.

By so maintaining the temperature of the water curtains 29, the same operate as quenching mediums so that material issuing from the chamber 19 is quenched to approximately 190° F.

Material then passes to the drying chamber 20. It has been found that if tubes or pipes are being heat treated, their volume with respect to their surface may in some cases be sufficient that at temperatures of around 190° F., the water on the surfaces thereof will be quickly vaporized in the drying chamber. However, to assure proper drying of the material being heat treated, the drying chamber 20 may be provided with a gas fired air heater 34, which may be utilized to maintain the temperature within the drying chamber such as to reheat the material to a temperature slightly above the boiling point of the quenching medium.

In case the quenching medium is water, the temperature maintained in the drying chamber is somewhere within the range of from 212° to 250° F., so that material passing therethrough is reheated and promptly dried, and yet the temperature of the material is not high enough to cause the material to become discolored or oxidized.

Referring to Fig. 2, an electrically heated special atmosphere, driven roller hearth conveyor, heat treating furnace is indicated generally at 40, and may be used for carrying out a bright annealing or heat treating operation on material such as copper tubes. The furnace 40 instead of being electrically heated may be heated by radiant tubes.

In the furnace 40, the conveyor rolls are generally indicated at 41 and extend in a usual manner throughout the length of the furnace from the loading table or zone C to the unloading table or zone D.

Material loaded on the conveyor rolls 41 at C first passes through the entrance passage, compartment or chamber indicated at 42, then through the preheating chamber indicated at 43, then through the furnace heating chamber indicated at 44, then through the cooling chamber indicated at 45 which may be water cooled if desired, then through the quenching and sealing chamber indicated at 46, and finally through the drying chamber indicated at 47; and the material issuing from the drying chamber 47 of the furnace 40 may be unloading at the unloading zone or table D.

The entrance passage 42 is provided with the improved sealing or closure means, consisting of a plurality of falling liquid curtains or sheets 48, preferably water curtains. The falling water curtains 48 flow from source bodies of water indicated generally at 49 maintained within the compartment 42, to the sump 50, wherein the fallen body of water collects.

The upper level of the fallen body of water in the sump 50 is indicated by the dot-dash water level line 51; and the curtains 48 are coextensive in width or breadth with the width of the entrance passage 42 so as to effectively seal the passage 42 while at the same time permitting free travel of material therethrough on the conveyor rolls 41.

The sump 50 may be provided with an outlet 64 from which liquid collected in the sump may be recirculated by a pump to the source bodies 49.

Material then passes from the passage 42 through the preheating chamber 43, which may be an insulated tunnel which serves to space the curtains 48 a desirable distance away from the furnace and in which more or less preheating or drying may take place.

A damper 53 may be utilized in the flue 52 for relieving any undesirable pressure which may build up on the furnace side of the water curtain seal 48. Another flue 54, provided with a damper 55, may communicate with the outer end of the passage 42 on the outside of the first water curtain 48, because the furnace gases may contain some carbon monoxide, or other poisonous gas, and the flue 54 may be desired for carrying off any slight amount of furnace gas which may escape through the water curtains 48 at the particular times when material passes through the water curtains.

The material being treated then passes from the chamber 43 into the heating chamber 44 of the furnace 40, which may be electrically heated by resistor elements 56. The special or controlled atmosphere which is to be provided and maintained in the furnace chamber 44 may be introduced by a pipe 56a into the cooling chamber 45, adjacent to the furnace exit, from whence the special atmosphere passes into the furnace heating chamber 44.

The material being treated then passes from the heating chamber 44 through the initial cooling chamber 45 and then through the quenching and sealing chamber 46 in which a plurality of falling liquid curtains or sheets 57, preferably water curtains, are maintained, similar to the water curtains 48. The water curtains 57 fall from source bodies of water indicated generally at 58 to the sump 59 wherein the water level of the fallen body of water may be maintained as indicated by the dot-dash line 60.

An outlet 61 (see Fig. 6) may be provided for the sump 59 which may communicate with a pump 110 for recirculating the water back to the source bodies 58; and the circulation system may if desired, be equipped with a thermostatic control 111 and provided with steam or cold water inlets 112 and 113 leading to a thermostatic mixing valve 114 controlled by control 111 so that the temperature of the water curtains 57 will be maintained at approximately 190° F., or just below the boiling temperature thereof.

The curtains 57 close off the quenching and sealing passage 46 against the escape of hot furnace gases, although they admit of free passage of materials being treated therethrough. By maintaining the temperature of the water curtains 57 at approximately 190° F., the same operate as quenching means for quenching the materials being treated to approximately 190° F.

In performing such a quenching operation, some steam may form in the quenching compartment 46 due to the contact of the water with the hot materials being treated, and this steam may be drawn off through the flue 62 controlled by a damper 63. No flue is shown on the furnace side of the curtains 57, because the pressure of the gases in the furnace is controlled by the flue 52 leading from the entrance passage 42.

Material, upon leaving the quenching and sealing chamber 46, is then introduced into the drying chamber 47, which may, if desired, be equipped with heating means such as steam coils 65 diagrammatically indicated at 65 through which air is driven, by a circulating fan 66, into the chamber 47 and thence out through flues 67, so as to reheat the material passing therethrough to a temperature somewhat above the boiling point of the quenching curtain liquid, as for instance within the range of from 212° to 250° F. in case the quenching medium is water.

The reheating of the material promptly dries the same and yet the material is not hot enough to oxidize or become discolored upon discharge from the drying chamber 47 into atmospheric air at the loading zone or station D.

The furnace 40 is adapted for heat treating any articles or materials which may be readily passed on a roller hearth conveyor, as for instance tubes, bars, rods and the like. Although the furnace 40 is shown as being electrically heated, the heating compartment 44 thereof may be heated in any other manner.

Referring to Fig. 3, a gas fired, special atmosphere, pusher type, bright annealing furnace is indicated generally at 70 and may be used for carrying out a bright annealing or heat treating operation on material such as coiled light gauge copper strips and the like. Such coils may be of varying sizes and may contain varying amounts of material. In the case of copper strips it is desirable to exclude air from the heating chamber so as to prevent a discloration of the surfaces of the same in carrying out the annealing operation so that the bright rolled surface of the material prior to heat treatment will not be affected by the heat treatment operation.

The furnace 70 may be provided with a rail 71, extending entirely through the furnace carrying rollers 72 upon which trays 73 having bulkheads 74, may be pushed, such as shown in my copending application, Serial No. 84,485 filed June 10, 1936. The coils or other material to be treated may be placed on the trays 73 at the loading zone or station E and the trays then move into the entrance chamber 75, the walls of which closely fit the tray bulkheads 74 for providing a seal to prevent the escape of furnace gases through the entrance compartment 75.

The trays 73 then move through the furnace heating chamber indicated at 76, then through the cooling chamber indicated at 77, then through the quenching and sealing chamber indicated at 78, then through the drying chamber indicated at 79, and then through a bulkhead exit sealing chamber 80, similar to the entrance chamber 75, to an unloading zone or station F. The trays 73 may then be returned by means of transfer cars 81 and/or a driven roller tray return, to a position adjacent to the loading zone E.

Assuming that coils of copper strip are being treated in the furnace 70, it may be undesirable to provide a water curtain seal at the entrance of the chamber 70 because water drops may find their way to places between coil strands and the coils may be so slowly heated in the heating chamber 76 that the surfaces of the strips will become covered with water spots before the water is vaporized. For this reason, a bulkhead type seal 74—75 is preferably utilized at the entrance end of the furnace.

In annealing copper, the temperatures within the furnace heating chamber 76 may range anywhere from 650° F. to 1400° F. more or less, and the furnace heating chamber may be gas fired as by means of burners 82 communicating with chambers located beneath a checker hearth through which the flame and products of combustion pass into the heating zone or compartment 76. For maintaining a special reducing or at least non-oxidizing atmosphere in the furnace 76, combustion may be so controlled as by maintaining a slight deficiency of air for combustion that the furnace gases will not in any way discolor the material being heat treated.

The material then passes from the chamber 76 through a cooling chamber 77 in which the temperature of the material may drop a few hundred degrees and the material then passes into the quenching and sealing chamber 78, wherein the material is deliberately wetted to quench the same to say 190° F. by means of a plurality of falling liquid curtains or sheets 83, preferably water curtains.

The water curtains 83 fall from source bodies 84 to the sump 85 wherein the fallen body of water is maintained at a level indicated generally by the dot-dash line 86. The water curtains 83 not only effectively quench the material, but effectively seal the passage through the quenching and sealing chamber 78 against the escape of furnace gases, although freely admitting the passage of the trays 73 with materials to be treated thereon through the chamber 78.

The sump 85 may be provided with an outlet 87 to which a pump may be connected in the manner shown in Fig. 6 for circulating the curtain liquid back to the source bodies 84; and the circulation system may if desired, be equipped with a thermostatic control such as shown in Fig. 6 and provided with steam or cold water inlets so that the temperature of the water curtains 83 may be maintained at approximately 190° F., or just below the temperature of vaporization of the sealing and quenching liquid.

By maintaining the temperature of the liquid curtains 83 at approximately 190° F., if water is the quenching medium, the material issuing from the chamber 78 is quenched to approximately the same temperature.

Thereafter the material passes to a drying chamber 79 which may be heated by steam coils to reheat the material to a temperature above the vaporization point of the quenching liquid, or if the same is water, to somewhere within the range or from 212° to 250° F. so as to promptly dry the material. The material then issues from the furnace through the seal chamber 80 at a temperature sufficiently low enough as not to cause oxidation or discoloration of its surfaces when exposed to atmospheric air at the loading zone or station F.

The improved sealing or closure means consisting of one or more liquid curtains for a passage communicating with the heating chamber of a heating or heat treating furnace through which the material being treated moves, such as the water curtains 21 and 48, indicated in Figs. 1 and 2, which form the closures or seals for the entrance passages of furnaces 10 and 40, respectively, or such as the water curtains 29, 57 and 83 indicated in Figs. 1, 2 and 3, which form the closures or seals for the exit passages from the furnaces 10, 40 and 70, respectively, is best illustrated in Fig. 5.

Three falling liquid curtains are shown, somewhat diagrammatically in Fig. 5, and the same may be the last three curtains 57 of the four shown in the quenching and sealing chamber 46 of the furnace 40 illustrated in Fig. 2. The quenching and sealing chamber 46 and the improved sealing and closure means therein, as applied to the furnace 40, are described somewhat in detail in connection with Fig. 5; but it is understood that the same description is applicable to any passage or compartment wherein the improved sealing or closure means is utilized.

The chamber 46 includes vertical side walls 75

90, a horizontal top wall 91 and an end wall 92, through which the chamber 46 communicates with the drying chamber 47. The conveyor rolls 41 are arranged in the usual manner crosswise within the chambers 46 and 47; and the top surface of the liquid in the sump 59 below the conveyor rolls 41 forms the bottom of the sealing and quenching chamber 46. The flue 62 controlled by the damper 63, communicates with the chamber 46, for a purpose which has already been described.

A plurality of troughs indicated generally at 93, are located in the upper region of the compartment 46 extending crosswise of the compartment between the side walls 90 thereof, coextensive in width with the width of the compartment 46. The troughs 93 preferably each include a substantially vertical portion 94, and each trough portion 94 then merges into the downwardly and then upwardly curved preferably half rounded portion 96, which in turn merges through a reversely curved portion 97 into a preferably diagonally upwardly slanting preferably plane weir or crest producing portion 98, which may be reinforced on its underside at 99.

A flat strip gas baffle 100 may extend downward from the top wall 91 adjacent to the portion 94 of each trough 93; and another water quieter baffle piece 101, extends downward from the top wall 91 into the trough 93 to a position below a horizontal plane through the upper outer edge of the diagonal trough portion 98 to smooth out the flow of water in the trough 93.

A liquid inlet pipe 102 extends between the compartment side walls 90 within each trough 93 intermediate the members 100 and 101; and each pipe 102 may be provided (see Fig. 7) with apertures 115 of graduated size, or apertures 116 (see Fig. 8) of the same size with graduated spacing, from end to end, so that liquid pumped into the pipes 102 may be uniformly distributed within each trough 93 so as to maintain a constant horizontal liquid level 103 in each trough to form the source body 58 for each falling liquid curtain 57.

The members 100 and 101 not only act as baffles to quiet the liquid introduced into the troughs 93 through the pipes 102, but also provide seals between the top wall 91 and the source bodies 58.

When the liquid level 103 of each source body 58 reaches a location, somewhat as shown in Fig. 5, above the outer upper edge of the trough portion 98, the liquid is discharged from and flows from the source body 58 over the weir portion 98, which produces a crest and then directly in a falling stream or curtain 57 to the sump 59. These falling liquid curtains 57 are co-extensive between the side walls 90 of the compartment 46, and when the troughs 93 are formed substantially as shown in Fig. 5, the falling liquid curtains 57 are almost glass-like in appearance. The flow of liquid into each trough 93 may be so controlled so that the thickness of each liquid curtain 57 as it falls from the source body 58 to the fallen body 60 in the sump 59, may be approximately one-fourth inch adjacent to the weir portion 98.

The liquid curtains 57 effectively seal the chamber 46 against the escape of gases through the compartment 46, but freely admit of the passage of material along the conveyor rolls 41. Of course, as material passes through any one liquid curtain 57, the same may be instantaneously broken, but at such time one or more of the remaining liquid curtains 57 provide the seal or closure for the compartment 46.

When the liquid curtains 57 are utilized in an exit chamber or passage from a furnace, the same may also provide the quenching means for the materials being treated, as has already been described; and the liquid in the fallen body 60 may, as stated, be recirculated from the sump 59 through an outlet 61 and back to the inlet pipes 102 within the troughs 93.

It is understood, that while water liquid curtains have been described, oil or other suitable liquids may be used as the liquid medium.

The provision of one or a plurality of liquid curtains as sealing or closure means for a passage communicating with a furnace heating chamber through which material to be treated is moved, makes it possible to directly fire a furnace, which is ordinarily the cheapest way of firing a heating or heat treating furnace; and makes it possible to treat objects of varying sizes or shapes in any particular furnace, in connection with which it is ordinarily impossible to satisfactorily seal by mechanical means such as doors and the like, the passages communicating with the furnace.

Having now described the features of the invention, the construction, operation and use of preferred forms of the same in connection with different types of furnaces, and the advantages and results obtained by the use of the same; the new and useful parts, elements, combinations, constructions and methods, and reasonable mechanical equivalents thereof obvious to those skilled in the art, are set forth in the appended claims.

I claim:—

1. Closure means for a passage communicating with the heating chamber of a heat treating furnace, including a trough with a weir discharge portion, a sump, means for supplying liquid to said trough to maintain a body of liquid therein having a substantially constant level, and baffle means projecting into said liquid body to maintain the same quiescent, whereby a smooth sheet of liquid falls from said trough weir to said sump to seal said passage.

2. The method of heat treating articles in a furnace which includes passing articles to be treated through a heating chamber, then through a quenching chamber and then through a drying chamber, sealing the heating chamber from the drying chamber by providing falling liquid curtain closure means in said quenching chamber, utilizing said liquid closure means as a quenching medium, and reheating said articles in the drying chamber.

3. The method of heat treating articles in a furnace which includes passing articles to be treated successively continuously through an entrance chamber, a heating chamber, a quenching chamber and a drying chamber, sealing the entrance and quenching chambers with falling liquid curtain closure means, utilizing said liquid closure means in the quenching chamber as a quenching medium, and reheating said articles in the drying chamber to above the temperature of vaporization of the quenching liquid.

4. Closure means for a passage communicating with the heating chamber of a heat treating furnace, including a trough in said passage having a wier discharge portion, a sump in said passage below the trough in which a fallen body of liquid collects, means for maintaining a source body of liquid in said trough at a substantially constant and uniform level at the crest of the weir whereby a smooth sheet of liquid falls from said source body to said fallen body coextensive in width with the width of said passage to seal said passage, and means for circulating said liquid from said fallen body to said source body.

5. In a passage communicating with the heating chamber of a heat treating furnace, means for maintaining a gaseous atmosphere under pressure in said passage, means in said passage for discharging a curtain of falling liquid across the passage to close the same, and means for controlling the pressure on opposite sides of said liquid curtain.

6. Closure means for a passage communicating with the heating chamber of a heat treating furnace, including a trough in said passage terminating in an upwardly directed discharge portion, a sump in the passage below the trough in which a body of liquid is maintained, and means for maintaining a constant and uniform liquid level in said trough adjacent to said upwardly directed portion whereby a smooth sheet of liquid falls freely from said upwardly directed portion directly to the body of liquid in said sump for sealing said passage.

7. In a furnace having a heating chamber, a compartment adjacent to said chamber having top and side walls, a liquid containing sump in said compartment, said top and side walls and the surface of the liquid in the sump forming a substantially horizontally extending passage communicating with the chamber through which passage material being treated is moved; and closure means for the passage including a source body of liquid in the upper portion of the passage extending between the side walls, means within the passage for discharging a substantially unbroken sheet of falling liquid from the source body coextensive in width with the width of the passage between the side walls downward to said sump, whereby the passage is sealed against the flow of gases therethrough to or from the heating chamber.

8. Closure means for a passage communicating with the heating chamber of a heat treating furnace, including a trough in said passage having a weir discharge terminating in an upwardly directed portion, a sump in the passage below the trough in which a body of liquid is maintained, and means in said passage for maintaining a constant and uniform liquid level in said trough, whereby a smooth sheet of liquid falls directly and freely from said upwardly directed portion to the body of liquid in said sump for sealing said passage.

9. Closure means for a passage communicating with the heating chamber of a heat treating furnace, including a trough in said passage having a weir discharge portion, a sump, means for supplying liquid to said trough to maintain a body of liquid therein having a substantially constant level, and means cooperating with the liquid body to maintain the same quiescent, whereby a smooth sheet of liquid falls from said trough weir to said sump to seal said passage.

10. Closure means for a passage communicating with the heating chamber of a heat treating furnace, including a trough in said passage having a weir discharge portion, a sump, means for supplying liquid to said trough to maintain a body of liquid therein, and means associated with the liquid body constructed and arranged so as to uniformly distribute the liquid at a substantially constant and quiescent level as it flows from said weir discharge portion, whereby a smooth sheet of liquid falls from said trough weir to said sump to seal said passage.

11. Closure means for a passage communicating with the heating chamber of a heat treating furnace, including a trough in said passage having a weir discharge portion, a sump, means for supplying liquid to said trough to maintain a body of liquid therein, and means associated with the liquid body constructed and arranged so as to maintain a constant, uniform and quiescent head of liquid co-extensive in width with the width of the passage at the weir discharge portion, whereby a smooth sheet of liquid falls from said trough weir to said sump to seal said passage.

12. Closure means for a passage communicating with the heating chamber of a heat treating furnace, including a trough in said passage having a weir discharge portion, a sump, means for supplying liquid to said trough to maintain a body of liquid therein, and said trough formation and liquid supplying means being constructed and arranged so that a uniform, quiescent head of liquid is maintained at said weir discharge portion, whereby a smooth sheet of liquid falls from said trough weir to said sump to seal said passage.

13. Closure means for a passage communicating with the heating chamber of a heat treating furnace, including a trough in said passage having a weir crest producing portion, a sump, means for supplying liquid to said trough to maintain a body of liquid therein, and means for maintaining a substantially smooth liquid level at the crest of the weir, whereby a smooth sheet of liquid falls from said crest to said sump to seal said passage.

FRANK T. COPE.